US008508636B2

(12) United States Patent
Motonaga (10) Patent No.: US 8,508,636 B2
(45) Date of Patent: Aug. 13, 2013

(54) IMAGE SENSING APPARATUS (75) Inventor: Yusaku Motonaga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 390 days.

(21) Appl. No.: 12/551,166

(22) Filed: Aug. 31, 2009

(65) Prior Publication Data

US 2010/0053395 A1 Mar. 4, 2010

(30) Foreign Application Priority Data

Sep. 1, 2008 (JP) ................................ 2008-223573

(51) Int. Cl.
*H04N 5/335* (2011.01)
(52) U.S. Cl.
USPC ............................ 348/296; 348/241; 348/308
(58) Field of Classification Search
USPC .................. 348/300, 241, 243, 303, 304, 307
See application file for complete search history.

(56) References Cited

U.S. PATENT DOCUMENTS

| 4,942,474 | A | 7/1990 | Akimoto et al. | |
|---|---|---|---|---|
| 6,839,084 | B1 * | 1/2005 | Hiyama et al. | 348/241 |
| 6,933,973 | B1 * | 8/2005 | Sako | 348/308 |
| 2002/0018058 | A1 * | 2/2002 | Tamura | 345/204 |
| 2003/0086005 | A1 * | 5/2003 | Nakamura | 348/223.1 |
| 2005/0052554 | A1 * | 3/2005 | Sakurai et al. | 348/301 |
| 2005/0259167 | A1 * | 11/2005 | Inoue et al. | 348/300 |
| 2006/0066741 | A1 * | 3/2006 | Koizumi et al. | 348/308 |
| 2006/0256203 | A1 * | 11/2006 | Honma | 348/220.1 |
| 2008/0018760 | A1 * | 1/2008 | Nakajima | 348/296 |
| 2009/0034954 | A1 * | 2/2009 | Kubota et al. | 396/121 |

FOREIGN PATENT DOCUMENTS

| CN | 1700745 A | 11/2005 |
|---|---|---|
| JP | 1-154678 A | 6/1989 |
| JP | 2006-345200 A | 12/2006 |

* cited by examiner

*Primary Examiner* — Tuan Ho
*Assistant Examiner* — Fayez Bhuiyan
(74) *Attorney, Agent, or Firm* — Canon U.S.A,. Inc. IP Division (57) ABSTRACT

An image sensing apparatus includes an image sensor having a plurality of pixels and a control unit configured to control the image sensor. Each pixel includes a photoelectric conversion element configured to convert light into an electric charge, an amplifier configured to amplify accumulated electric charge, a transfer switch configured to input a signal of the photoelectric conversion element to the amplifier when being turned on, a reset switch configured to reset the input to the amplifier when being turned on, and a selection switch configured to output an output from the amplifier to a signal output line when being turned on.

8 Claims, 8 Drawing Sheets

IMAGE SENSING APPARATUS

BACKGROUND OF THE INVENTION

1. Field of the Invention

The present invention relates to image sensing apparatuses, and more particularly to image sensing apparatuses capable of performing an image sensing operation with an increased frame rate.

2. Description of the Related Art

In recent years, image sensing apparatuses such as digital still cameras and digital video cameras have been increasing the number of pixels of an image sensor thereof. As being represented by a complementary metal-oxide semiconductor (CMOS) sensor, sensors of an XY-address type provided with an amplifier for each pixel have being greatly developed.

Regarding operations of the sensors, Japanese Patent Application Laid-Open No. 01-154678 discusses a technique for subtracting signals generated when an input of the pixel to the amplifier is reset from pixel signals to eliminate a noise.

For example, when the pixel signals in one horizontal line are read out, the input of the pixels in the one horizontal line to the amplifier is reset. The generated signals in the one horizontal line when the input is reset are stored as noise signals. The pixel signals in the one horizontal line are read out and stored separately from the noise signals. A paired pixel signal and noise signal for each pixel are output from the sensor. By subtracting the noise signals from the pixel signals, the image signals having a reduced noise can be acquired.

Regarding recording of a moving image, a mainstream has been changing to the high definition (HD) (1920×1080 pixels) of a standard image size for a moving image from the Quarter Video Graphic Array (QVGA) (320×240 pixels) or the Video Graphics Array (VGA) (640×480 pixels) owing to the increasing number of pixels of an image sensor. Therefore, a moving image is recorded at a higher resolution than ever without decreasing the frame rate.

However, according to Japanese Patent Application Laid-Open No. 01-154678, since reading out the noise signal and the pixel signal is performed, an operation time for reading out the image increases. Thus, when considering the frame rate, the time for reading out the image may not be sufficiently provided for recording the high definition (HD) moving image.

SUMMARY OF THE INVENTION

According to an aspect of the present invention, an image sensing apparatus includes an image sensor having a plurality of pixels and a control unit configured to control the image sensor. Each of the plurality of pixels includes a photoelectric conversion element configured to convert light into an electric charge, an amplifier configured to amplify the electric charge, a transfer switch configured to input a signal of the photoelectric conversion element to the amplifier when being turned on, a reset switch configured to reset the input to the amplifier when being turned on, and a selection switch configured to output an output from the amplifier to a signal output line when being turned on. The control unit is capable of executing a first readout operation in which, sequentially with the transfer switch turned off, with the reset switch turned on, and with the selection switch turned on, a first signal is output from the amplifier to the signal output line and a second readout operation in which, sequentially with the reset switch turned off, with the transfer switch turned on, and the selection switch turned on, a second signal is output from the amplifier to the signal output line. The control unit is further capable of selecting and executing a first mode in which the first readout operation and the second readout operation are executed for respective predetermined time periods to acquire an image and a second mode in which the first readout operation is executed for a time period shorter than the predetermined time period for the first mode to acquire an image.

According to another aspect of the present invention, an image sensing apparatus includes an image sensor having a plurality of pixels and a control unit configured to control the image sensor. Each of the plurality of pixels includes a photoelectric conversion element configured to convert light into electric charge, an amplifier configured to amplify the electric charge, a transfer switch configured to input a signal of the photoelectric conversion element to the amplifier when being turned on, a reset switch configured to reset the input to the amplifier when being turned on, and a selection switch configured to output an output from the amplifier to a signal output line when being turned on. The control unit is capable of executing a first readout operation in which, sequentially with the transfer switch turned off, with the reset switch turned on, and with the selection switch turned on, a first signal is output from the amplifier to the signal output line and a second readout operation in which, sequentially with the reset switch turned off, with the transfer switch turned on, and the selection switch turned on, a second signal is output from the amplifier to the signal output line. The control unit is further capable of selecting and executing a first mode in which the first readout operation and the second readout operation are executed for respective predetermined time periods to acquire an image and a second mode in which the first readout operation and the second readout operation are executed for respective time periods shorter than the predetermined time periods for the first mode to acquire an image.

Further features and aspects of the present invention will become apparent from the following detailed description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
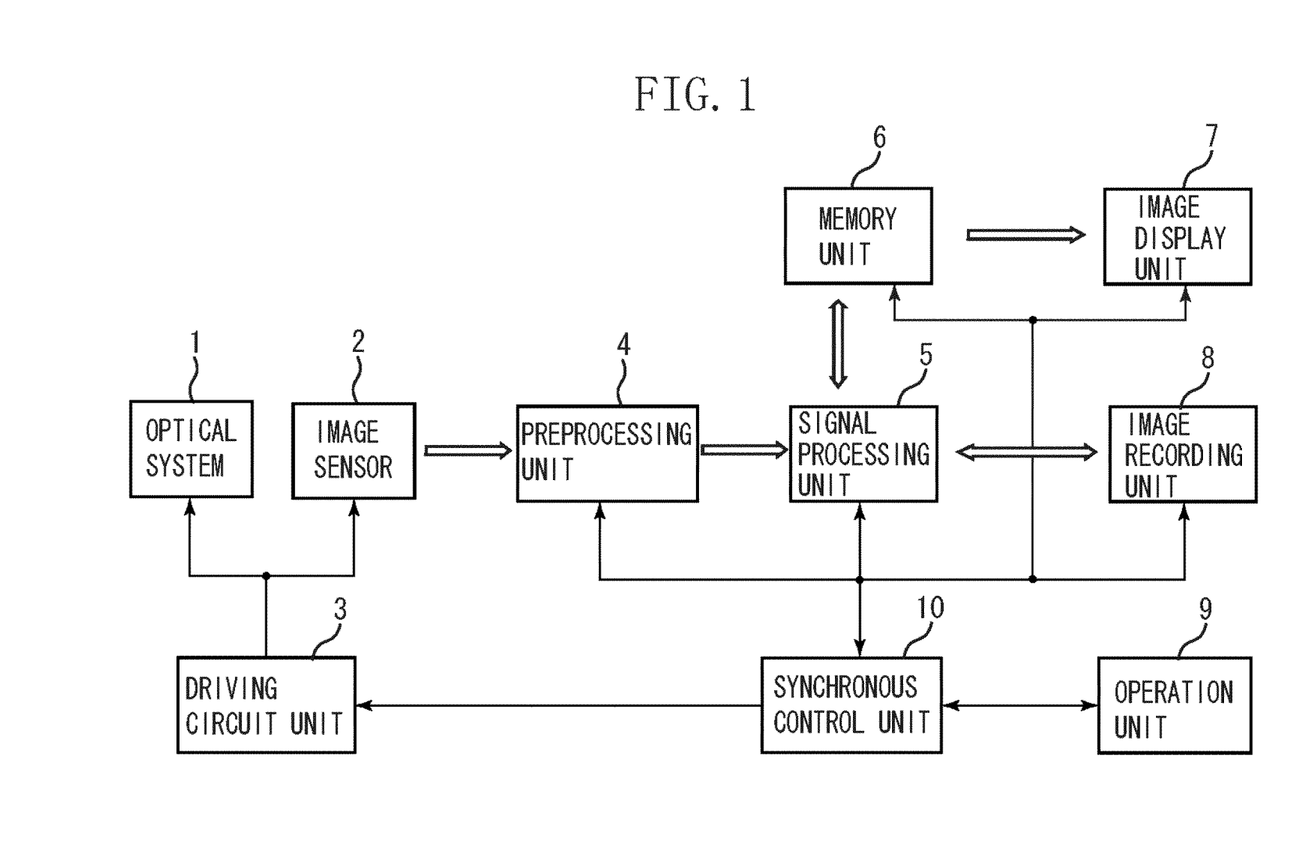
FIG. 1 is a block diagram illustrating an image sensing apparatus according to a first exemplary embodiment of the present invention.

FIG. 1 is a block diagram illustrating an image sensing apparatus according to a first exemplary embodiment of the present invention. As illustrated in FIG. 1, the image sensing apparatus includes an optical system 1, an image sensor 2, a driving circuit unit 3, a preprocessing unit 4, a signal processing unit 5, a memory unit 6, an image display unit 7, an image recording unit 8, an operation unit 9, and a synchronous control unit 10. The optical system 1 includes a focusing lens for forming an object image on the image sensor 2, a zooming lens for performing optical zooming, a diaphragm for adjusting brightness of the object image, and a shutter for controlling exposure.

The image sensor 2 includes a plurality of pixels arrayed in horizontal and vertical directions and a circuit for outputting signals read out from the pixels in a predetermined order. Details will be described using FIG. 2 below. The driving circuit unit 3 supplies a constant voltage or a pulse having a strengthened driving ability according to a control signal from the synchronous control unit 10 to drive the optical system 1 and the image sensor 2.

The preprocessing unit 4 is controlled by a control signal from the synchronous control unit 10 and includes a correlated double sampling (CDS) circuit, a gain control amplifier, and an analog/digital (A/D) converting circuit. The CDS circuit eliminates a noise component such as a reset noise included in an output signal from the image sensor 2 that is an analog signal. The gain controlling amplifier adjusts amplitude of the output signal from which the noise is eliminated. The A/D converting circuit converts the output signal that is the analog signal having the adjusted amplitude into a digital signal.

The signal processing unit 5 is controlled by the control signal from the synchronous control unit 10, performs appropriate signal processing on the output signal that is converted into the digital signal and transmitted from the preprocessing unit 4, and converts the output signal into image data. Further, the signal processing unit 5 outputs the output signal converted into the digital signal and the image data to the memory unit 6 and the image recording unit 8, receives the output signal converted into the digital signal and the image data from the memory unit 6 and the image recording unit 8, and performs the signal processing. Furthermore, the signal processing unit 5 has a function for detecting light metering data, such as a focus state and an exposure amount, from the output signal of the image sensor 2 and transmitting the light metering data to the synchronous control unit 10.

The memory unit 6 is controlled by the control signal from the synchronous control unit 10 and temporarily stores the output signal of the image sensor 2 converted into the digital signal and the signal-processed image data. Further, the memory unit 6 also has a function for outputting the image data for display to the image display unit 7. The image display unit 7 is controlled by the control signal from the synchronous control unit 10 and includes an EVF and a liquid crystal display (LCD) that display the image data which is for display and to be stored in the memory unit 6 to determine a composition before image shooting and to confirm the image after the image shooting.

Furthermore, the image display unit 7 generally uses the number of display pixels less than the number of vertical pixels of the image sensor 2. According to the present exemplary embodiment, the number of display pixels of the image display unit 7 is less than the number of pixels of the image sensor 2.

The image recording unit 8, where a memory card is detachable, is controlled by the control signal from the synchronous control unit 10, records the output signal converted into the digital signal and the image data transmitted from the signal processing unit 5 in the memory card, and reads the output signal and the image data from the memory card. The operation unit 9 can convey to the synchronous control unit 10 an instruction from an external device input using an operation member, such as a switch, a pressing button and a dial, e.g., a state of a power switch of the image sensing apparatus, a state of the pressing button for instructing image shooting, or a state of a mode dial for selecting a shooting mode.

Further, the operation unit 9 conveys to the synchronous control unit 10 a menu operation for previously directing an instruction of image display before shooting an image, various kinds of instructions for shooting an image, a display of a shot image, or an operation of the image sensing apparatus. Furthermore, the operation unit 9 can display a state of the image sensing apparatus using a display unit, such as an LCD and a light-emitting diode (LED), or the image display unit 7 according to the control signal from the synchronous control unit 10.

A user may use the image display unit 7 as the display unit and operate a screen using a touch panels provided on the image display unit 7 as the operation member. The synchronous control unit 10 controls the entire image sensing apparatus according to the instruction from the operation unit 9. Furthermore, the synchronous control unit 10 controls the optical system 1 according to the light metering data, such as a focus state and an exposure amount, transmitted from the signal processing unit 5 and causes an optimum image of the object to be formed on the image sensor 2.

Moreover, the synchronous control unit 10 can detect a usage state of the memory unit 6, a mounting state or a usage state of the memory card detachable from the image recording unit 8.

The image sensing apparatus according to the present exemplary embodiment operates as follows.

<Control of a Display Image>

(1) An instruction from a power switch of the operation unit 9 turns on a power.

(2) The signal processing unit 5 converts the image signal from the image sensor 2 into the image data for display, displays the image data on the image display unit 7, detects the light metering data, and transmits the light metering data to the synchronous control unit 10.

(3) The synchronous control unit 10 controls the optical system 1 via the driving circuit unit 3 based on the light metering data.

(4) The image sensing apparatus repeats the operations (2) and (3) and waits the instruction from the operation unit 9.

<Control of Still Image Shooting>

(1) An instruction by a shooting switch of the operation unit 9 starts control of still image shooting.

(2) The signal processing unit 5 detects the light metering data from the image signal transmitted from the image sensor 2 and transmits the light metering data to the synchronous control unit 10.

(3) Based on the light metering data, the synchronous control unit 10 controls the optical system 1 via the driving circuit unit 3.

(4) The image sensor 2 exposes the still image for recording and outputs the signal.

(5) The signal processing unit 5 converts the image signal from the image sensor 2 into the image data for recording, transmits the image data to the image recording unit 8, records the image data for recording in the detachable memory card, converts the image data for recording into the image data for display, and displays the image data for display on the image display unit 7.

(6) The image sensing apparatus returns to controlling the display image.

Figure 2:
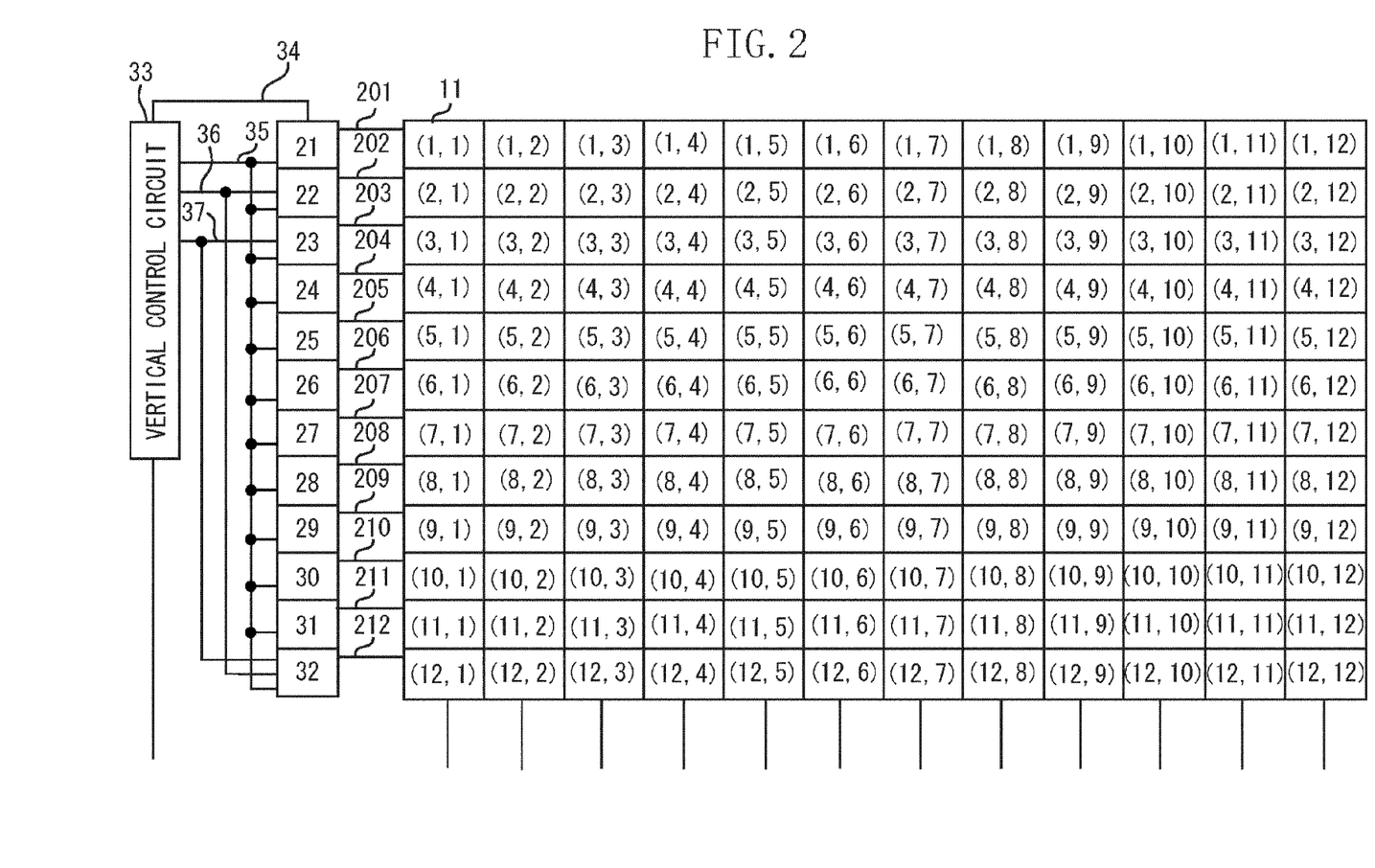
FIG. 2 illustrates an example of a configuration of an image sensor according to the first exemplary embodiment of the present invention.

With reference to FIGS. 2, 3, 4, and 5, the image sensor 2 will be described in detail. In FIG. 2, for convenience of description, the image sensor 2 is illustrated with 12 pixels in the horizontal direction by 12 pixels in the vertical direction.

In FIG. 2, a pixel 11 indicates one of the pixels that convert entered light into an electric signal. An address of the pixel 11 indicating the position of the pixel in the horizontal direction (H) and the vertical direction (V) is expressed as (1, 1). All pixels have the same configurations as that of the pixel 11, except that the pixels have different vertical control lines and different vertical signal lines depending on pixels corresponding thereto. The address indicating the position of the pixel is expressed as (H, V).

Figure 3:
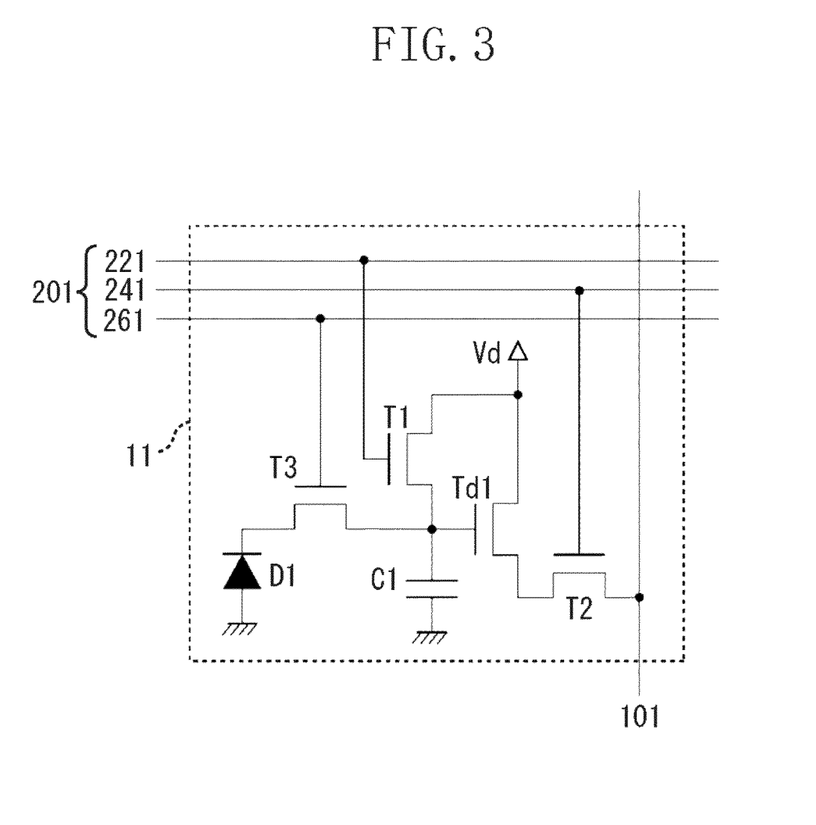
FIG. 3 illustrates an example of a configuration of a pixel of the image sensor illustrated in FIG. 2 according to the first exemplary embodiment of the present invention.

FIG. 3 illustrates an example of a configuration of the pixel 11. In FIG. 3, a portion surrounded by dotted lines indicates the pixel 11. The pixel 11 is connected to the outside via a vertical control line 201 and a vertical signal line 101. The vertical control line 201 is connected in common to all pixels in the one horizontal line and simultaneously controls the pixels in the one horizontal line. The vertical signal line 101 is connected in common to all pixels in one vertical line and outputs the pixel signal. The vertical control line 201 includes a reset control line 221, a vertical address line 241, and a transfer control line 261.

A photoelectric conversion element D1 converts light into electric charge. A floating diffusion (FD) capacitor C1 accumulates the electric charge when converting the electric charge of the photoelectric conversion element D1 into a voltage. A driving transistor (amplifier) Td1 drives an amplifier in the pixel and outputs the voltage according to the voltage of the FD capacitor C1. A reset transistor (reset switch) T1 is connected to the reset control line 221 to reset the voltage of the FD capacitor C1.

A selection transistor (selection switch) T2 is connected to the vertical address line 241 and outputs the output from the driving transistor Td1 as the output signal from the pixel to the vertical signal line 101. A transfer transistor (transfer switch) T3 is connected to the transfer control line 261 and controls the electric charge to be transferred from the photoelectric conversion element D1 to the FD capacitor C1.

A power supply Vd supplies a power for the driving transistor Td1 and the reset transistor T1. According to the present exemplary embodiment, the transistors except for the driving transistor Td1 function as the switches that become conductive when the control line connected to the gate is turned on and nonconductive when the control line is turned off.

Reading the noise and the pixel signal by the image sensor 2 will be described. Reading the noise when the image sensor 2 reads out the pixels in the horizontal line will be described. Since the vertical control line controls all pixels in one horizontal line, other pixels are also similarly operated. Thus, a pixel (1, 1) will be described as an example.

With the transfer transistor T3 turned off, after the reset transistor T1 is turned on by the reset control line 221 and the voltage of the FD capacitor C1 is reset, the reset transistor T1 is turned off. Next, the selection transistor T2 is turned on by the vertical address line 241, and a reset voltage of the FD capacitor C1 is output to the vertical signal line (signal output line) 101. This signal becomes the noise signal (first signal) and an operation for reading out the noise signal (first readout operation) is defined as noise reading.

Pixel-signal reading will be described. With the reset transistor T1 turned off, when the transfer transistor T3 is turned on by the transfer control line 261, the electric charge is transferred from the photoelectric conversion element D1 to the FD capacitor C1. The noise signal generated in the FD capacitor C1 and the electric charge transferred from the photoelectric conversion element D1 are added together to be converted into a pixel signal.

Subsequently, the selection transistor T2 is turned on by the vertical address line 241 and the signal voltage of the FD capacitor C1 is output to the vertical signal line 101. This signal becomes a pixel signal (second signal) and an operation for reading out the pixel signal (second readout operation) is defined as pixel-signal reading.

A time period Nread1 for reading the noise and a time period Sread1 for reading the pixel signal that are used for the still image shooting are each referred to as a "normal reading operation". Further, a time period for reading the noise and a time period for reading the pixel signal that are shorter than the "normal reading operation" are each referred to as a "short-time reading operation". The "normal reading operation" and the "short-time reading operation" will be described in detail below.

Returning to FIG. 2, vertical shift registers 21, 22, 23, 24, 25, 26, 27, 28, 29, 30, 31, and 32 can select the vertical control lines 201, 202, 203, 204, 205, 206, 207, 208, 209, 210, 211, and 212 connected to the pixels to be read out. A vertical control circuit 33 controls the vertical shift registers 21, 22, 23, 24, 25, 26, 27, 28, 29, 30, 31, and 32 by an instruction of the control signal from the synchronous control unit 10 via a control input terminal 16.

A vertical shift register control line 34 can give any one instruction of an "one-line reading operation", a "two-line addition operation", and a "three-line addition operation" to the vertical shift registers 21, 22, 23, 24, 25, 26, 27, 28, 29, 30, 31, and 32. A vertical register selection line 35 of the vertical register selection lines 35, 36, and 37 can select all of the vertical shift registers 21, 22, 23, 24, 25, 26, 27, 28, 29, 30, 31, and 32. A vertical register selection line 36 can select the vertical shift registers 22, 24, 26, 28, 30, and 32. Further, a vertical register selection line 37 can select the vertical shift registers 23, 26, 29, and 32.

For example, if the vertical shift register control line 34 instructs the "one-line reading operation" and the vertical register selection line 35 is selected, the vertical shift registers 21, 22, 23, 24, 25, 26, 27, 28, 29, 30, 31, and 32 can be controlled so that the vertical control lines 201, 202, 203, 204, 205, 206, 207, 208, 209, 210, 211, and 212 are selected for each line in order.

If the vertical shift register control line 34 instructs the "one-line reading operation" and the vertical register selection line 36 is selected, the vertical shift registers 21, 22, 23, 24, 25, 26, 27, 28, 29, 30, 31, and 32 can be controlled so that the vertical control lines 202, 204, 206, 208, 210, and 212 are selected in order.

If the vertical shift register control line 34 instructs the "one-line reading operation" and the vertical register selection line 37 is selected, the vertical shift registers 21, 22, 23, 24, 25, 26, 27, 28, 29, 30, 31, and 32 can be controlled so that the vertical control lines 203, 206, 209, and 212 are selected in order.

Further, if the vertical shift register control line 34 instructs the "two-line addition operation" and the vertical register selection line 35 is selected, the vertical shift registers 21, 22, 23, 24, 25, 26, 27, 28, 29, 30, 31, and 32 can be controlled so that each of the vertical control lines 201, 202, 203, 204, 205, 206, 207, 208, 209, 210, 211, and 212 simultaneously selects two lines in the one-line reading operation. With this operation, the signals of two pixels are added and averaged in the vertical direction and output to the vertical signal lines.

Furthermore, if the vertical shift register control line 34 instructs the "three-line addition operation" and the vertical register selection line 35 is selected, the vertical shift registers 21, 22, 23, 24, 25, 26, 27, 28, 29, 30, 31, and 32 can be controlled so that each of the vertical control lines 201, 202, 203, 204, 205, 206, 207, 208, 209, 210, 211, and 212 simultaneously selects three lines in the one-line reading operation. With this operation, the signals of three pixels are added together and averaged in the vertical direction and output to the vertical signal lines.

An adding circuit 12 can add the signals read out from the pixels transmitted to the vertical signal lines 101, 102, 103, 104, 105, 106, 107, 108, 109, 110, 111, and 112. An addition control circuit 40 controls the adding circuit 12 by the instruction of the control signal from the synchronous control unit 10 via the control input terminal 16. Addition control lines 41, 42, 43, 44, 45, 46, 47, and 48 are used to control the adding circuit 12.

A horizontal readout circuit 13 is controlled by horizontal control lines 401, 402, 403, 404, 405, 406, 407, 408, 409, 410, 411, and 412 and can transmit addition signals transmitted via addition output lines 301, 302, 303, 304, 305, 306, 307, 308, 309, 310, 311, and 312 of the adding circuit 12 to an output circuit 14.

The output circuit 14 includes a current amplifying circuit and a voltage amplifying circuit. The output circuit 14 appropriately amplifies a current and a voltage of a transmitted signal and outputs the amplified signal to the preprocessing unit 4 via an output terminal 15. Horizontal readout control lines 49, 50, and 51 are used to control the horizontal readout circuit 13.

Horizontal shift registers 61, 62, 63, 64, 65, 66, 67, 68, 69, 70, 71, and 72 can select the horizontal control lines 401, 402, 403, 404, 405, 406, 407, 408, 409, 410, 411, and 412. A horizontal control circuit 73 controls the horizontal shift registers 61, 62, 63, 64, 65, 66, 67, 68, 69, 70, 71, and 72 by the instruction of the control signal from the synchronous control unit 10 via the control input terminal 16. A horizontal shift register control line 74 can instruct either one of an "operation with noise reading" and an "operation without noise reading" for the horizontal shift registers 61, 62, 63, 64, 65, 66, 67, 68, 69, 70, 71, and 72 described below.

A horizontal register selection line 75 of horizontal register selection lines 75, 76, and 77 can select all of the horizontal shift registers 61, 62, 63, 64, 65, 66, 67, 68, 69, 70, 71, and 72. The horizontal register selection line 76 can select the horizontal shift registers 61, 63, 65, 67, 69, and 71. Further, the horizontal register selection line 77 can select the horizontal shift registers 61, 64, 67, and 70.

For example, if the horizontal register selection line 75 is selected, by an instruction for starting an operation via the horizontal shift register control line 74, the horizontal shift registers 61, 62, 63, 64, 65, 66, 67, 68, 69, 70, 71, and 72 can be controlled so that the horizontal control lines 401, 402, 403, 404, 405, 406, 407, 408, 409, 410, 411, and 412 are selected for each column in order.

If the horizontal register selection line 76 is selected, by the instruction for starting the operation via the horizontal shift register control line 74, the horizontal shift registers 61, 62, 63, 64, 65, 66, 67, 68, 69, 70, 71, and 72 can be controlled so that the horizontal control lines 401, 403, 405, 407, 409, and 411 are selected for each column in order.

If the horizontal register selection line 77 is selected, by the instruction for starting the operation via the horizontal shift register control line 74, the horizontal shift registers 61, 62, 63, 64, 65, 66, 67, 68, 69, 70, 71, and 72 can be controlled so that the horizontal control lines 401, 404, 407, and 410 are selected for each column in order.

Figure 4:
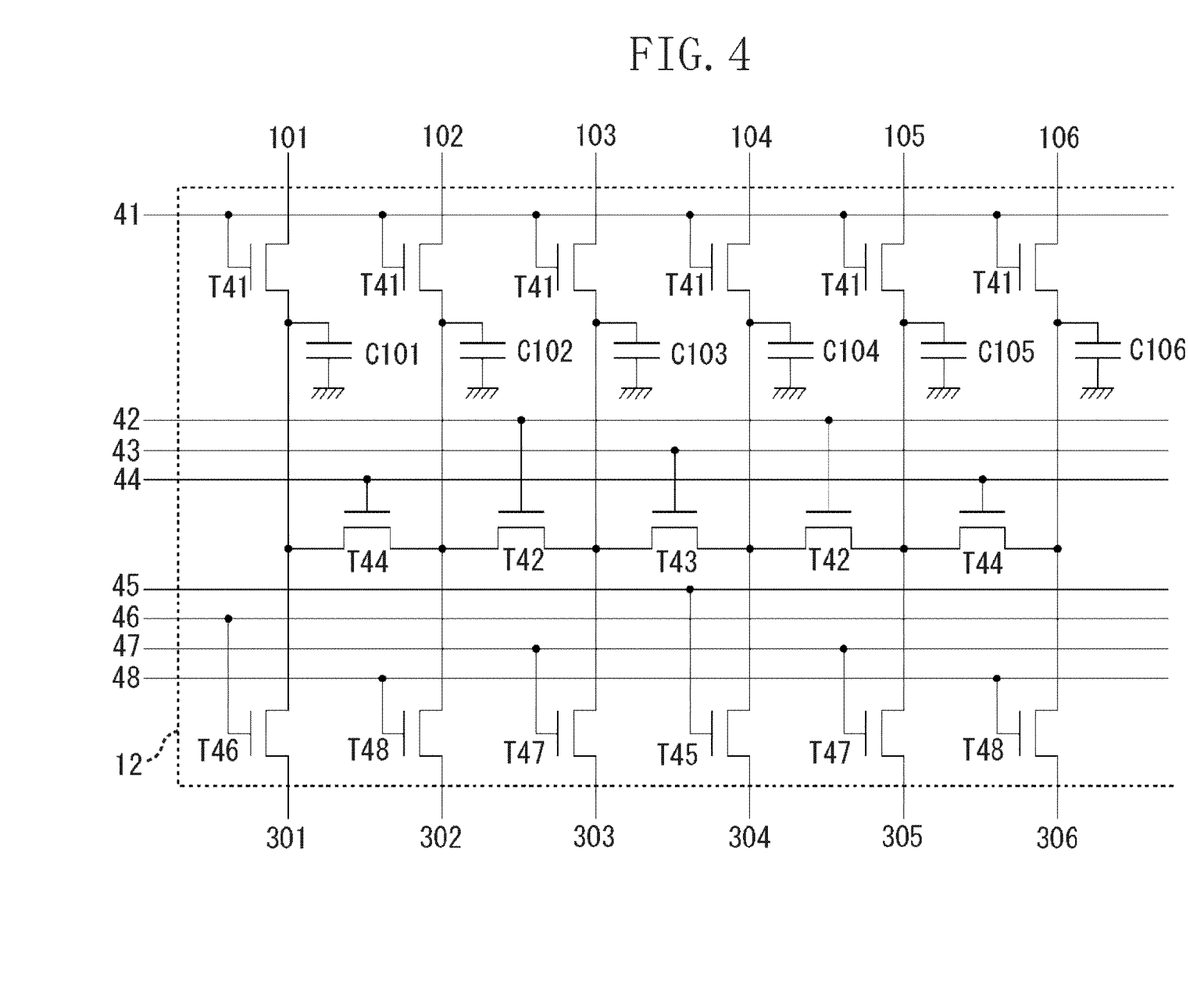
FIG. 4 illustrates an example of a configuration of an adding circuit of the image sensor illustrated in FIG. 2 according to the first exemplary embodiment of the present invention.

FIG. 4 illustrates an example of the adding circuit 12. In FIG. 4, only a portion corresponding to six pixels at the left side of the image sensor 2 illustrated in FIG. 2 is illustrated, while a portion corresponding to six pixels at the right side has a similar configuration. In FIG. 4, the transistors T41, T42, T43, T44, T45, T46, T47, and T48 function as switches that become conductive or nonconductive by being turned on/off by the addition control lines 41, 42, 43, 44, 45, 46, 47, and 48, respectively.

Storage capacitors C101, C102, C103, C104, C105, and C106 (storage capacitors C107, C108, C109, C110, C111, and C112 for six pixels at the right side are not illustrated) accumulate the signals read out from the pixels transmitted to the vertical signal lines 101, 102, 103, 104, 105, and 106 (vertical signal lines 107, 108, 109, 110, 111, and 112 for six pixels at the right side (FIG. 2)). Addition output lines 301, 302, 303, 304, 305, and 306 (addition output lines 307, 308, 309, 310, 311 and 312 (FIG. 2)) are output lines for outputting from the adding circuit 12.

With reference to FIG. 4, an example of an operation of the adding circuit 12 will be described. Firstly, by control of an addition control line 41, the transistor T41 is turned on and the signals readout from the pixels transmitted to the vertical signal lines 101, 102, 103, 104, 105, and 106 are accumulated in the storage capacitors C101, C102, C103, C104, C105, and C106. Then, the transistor T41 is turned off.

When the signals are not added, by control of the addition control lines 45, 46, 47, and 48, the transistor T45, T46, T47, and T48 are turned on and the signals in the storage capacitors C101, C102, C103, C104, C105, and C106 are output to the addition output lines 301, 302, 303, 304, 305, and 306.

When horizontal two pixels are added together, the transistors T43 and T44 are turned on by control of the addition control lines 43 and 44, and the transistor T46 and T47 are turned on by control of the addition control lines 46 and 47. With this operation, every two signals in the storage capacitors C101, C102, C103, C104, C105, and C106 are added together and averaged, and then output to each of the corresponding addition output lines 301, 303, and 305.

When horizontal three pixels are added together, the transistors T42 and T44 are turned on by control of the addition control lines 42 and 44, and the transistors T45 and T46 are turned on by control of the addition control lines 45 and 46. With this operation, every three signals in the storage capacitors C101, C102, C103, C104, C105, and C106 are added together and averaged, and then output to each of the corresponding addition output lines 301 and 304.

Figure 5:
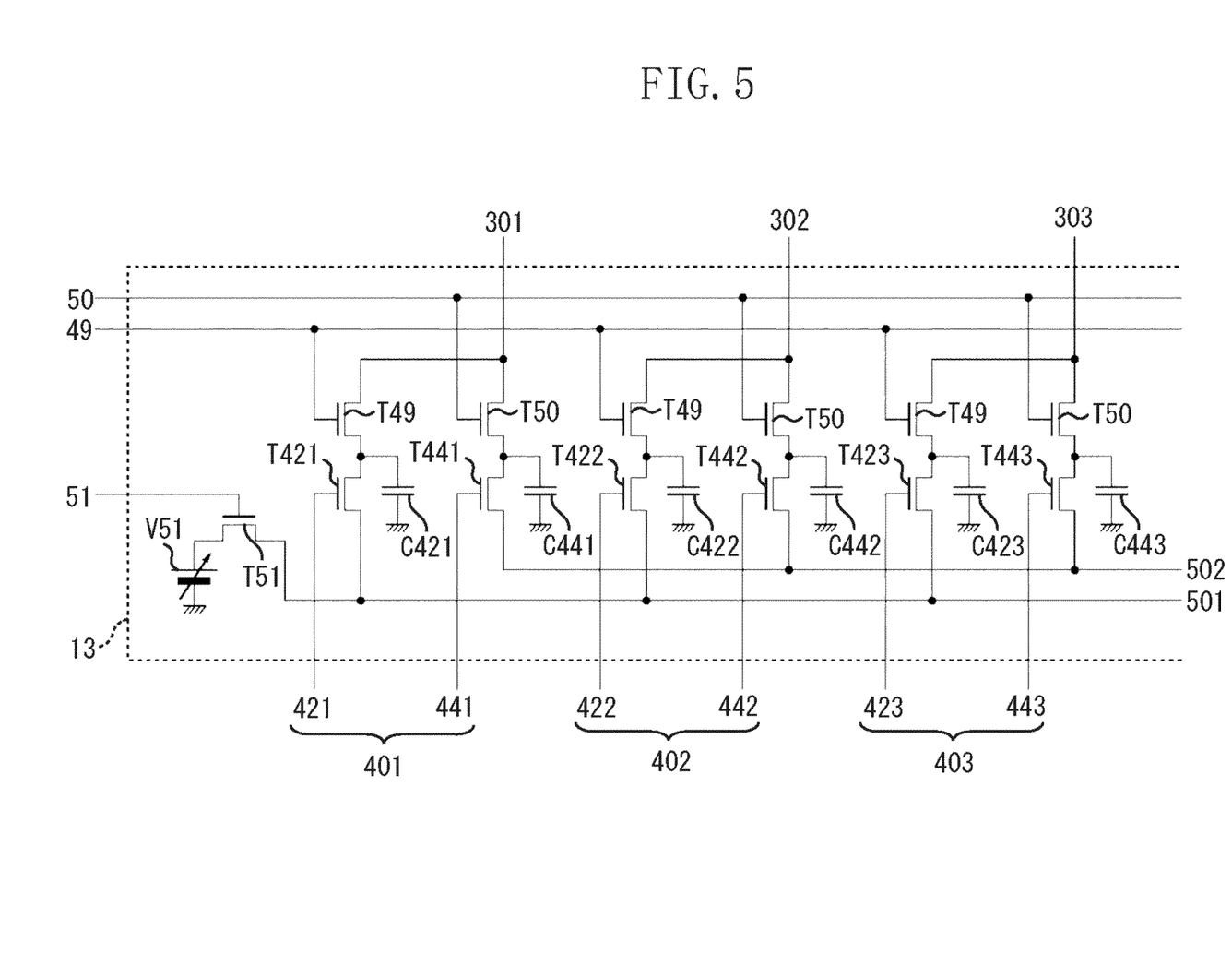
FIG. 5 illustrates an example of a configuration of a horizontal readout circuit of the images sensor illustrated in FIG. 2 according to the first exemplary embodiment of the present invention.

FIG. 5 illustrates an example of a configuration of the horizontal readout circuit 13. In FIG. 5, only a portion corresponding to three pixels at the left side of the image sensor 2 illustrated in FIG. 2 is illustrated, while a portion corresponding to nine pixels at the right side has a similar configuration. Transistors T49, T50, and T51 function as switches that become conductive or nonconductive by being turned on/off by the horizontal readout control lines 49, 50, and 51, respectively.

The transistor T421, T422, and T423 (T424, T425, T426, T427, T428, T429, T430, T431, and T432 for the nine pixels at the right side) function as switches that become conductive or nonconductive by being turned on/off by the control lines 421, 422, and 423 (control lines 424, 425, 426, 427, 428, 429, 430, 431, and 432 for the nine pixels at the right side), respectively. The transistor T441, T442, and T443 (T444, T445, T446, T447, T448, T449, T450, T451, and T452 for the nine pixels at the right side) function as switches that become conductive or nonconductive by being turned on/off by the control lines 441, 442, and 443 (control lines 444, 445, 446, 447, 448, 449, 450, 451, and 452 for the nine pixels at the right side), respectively.

The horizontal control lines 401, 402, and 403 (horizontal control lines 407, 408, 409, 410, 411, and 412 for the nine pixels at the right side) include corresponding noise control lines 421, 422, and 423 (noise control lines 424, 425, 426, 427, 428, 429, 430, 431, and 432 for the nine pixels at the right side) and corresponding signal control lines 441, 442, and 443 (signal control lines 444, 445, 446, 447, 448, 449, 450, 451, and 452 for the nine pixels at the right side). Storage capacitors C421, C422, and C423 (C424, C425, C426, C427, C428, C429, C430, C431, and C432 for the nine pixels at the right side) and storage capacitors C441, C442, and C443 (C444, C445, C446, C447, C448, C449, C450, C451, and C452 for the nine pixels at the right side) accumulate the signals transmitted via the transistors T49 and T50.

Further, a variable voltage supply V51 applies a predetermined voltage to a horizontal noise line 501. The output circuit 14 illustrated in FIG. 2 functions as a differential amplifier provided with the horizontal noise line 501 and the horizontal signal line 502 for inputting the voltage and the signal thereto, amplifies a differential signal into an appropriate current or an appropriate voltage, and outputs the amplified signal to the preprocessing unit 4 via the output terminal 15.

Next, with reference to FIG. 5, an operation of the horizontal readout circuit 13 will be described. When the horizontal readout circuit 13 reads the noises, the transistor T49 is turned on by control of a horizontal readout control line 49 and the noise signals transmitted to the addition output lines 301, 302, and 303 are accumulated in the storage capacitors C421, C422, and C423. Then, the transistor T49 is turned off.

When the horizontal readout circuit 13 reads the pixel signal, the transistor T50 is turned on by control of a horizontal readout control line 50, and the pixel signals transmitted to the addition output lines 301, 302, and 303 are accumulated in the storage capacitors C441, C442, and C443. Then, the transistor T50 is turned off.

Next, the "operation with noise reading" and the "operation without noise reading" by the horizontal readout circuit 13 illustrated in the FIG. 2 will be described. When the "operation with noise reading" is instructed by the control signal from the synchronous control unit 10, the horizontal shift register control line 74 controls the horizontal shift registers 61, 62, 63, 64, 65, 66, 67, 68, 69, 70, 71, and 72.

The horizontal shift register control line 74 gives an instruction such that both of the noise control lines (421, 422, and 423 in FIG. 5) and the signal control lines (441, 442, and 443 in FIG. 5) included in the corresponding horizontal control lines 401, 402, 403, 404, 405, 406, 407, 408, 409, 410, 411, and 412 control the transistors (T421, T422, T423, and T441, T442, and T443 in FIG. 5).

With this operation, by an instruction for starting the operation via the horizontal shift register control line 74, the horizontal control lines 401, 402, 403, 404, 405, 406, 407, 408, 409, 410, 411, and 412 (the noise control lines 421, 422, and 423 and the signal control lines 441, 442, and 443 included in the horizontal control lines 401, 402, and 403 in FIG. 5) are selected in order.

The noise signals accumulated in the storage capacitors C421, C422, and C423 corresponding to the selected horizontal control lines and the pixel signals accumulated in the storage capacitors C441, C442, and C443 are output to the horizontal noise line 501 and the horizontal signal line 502, respectively. As described above, the differential output between the pixel signals and the noise signals for one horizontal line is output via the output circuit 14.

Next, when the "operation without noise reading" is instructed by the control signal from the synchronous control unit 10, the horizontal shift register control line 74 controls the horizontal shift registers 61, 62, 63, 64, 65, 66, 67, 68, 69, 70, 71, and 72. The synchronous control unit 10 gives an instruction such that the signal control lines (441, 442, and 443 in FIG. 5) included in the corresponding horizontal control lines 401, 402, 403, 404, 405, 406, 407, 408, 409, 410, 411, and 412 control the transistors (T441, T442, and T443 in FIG. 5).

Furthermore, by the control signal from the synchronous control unit 10, the horizontal readout control line 51 turns on the transistor T51 to apply a predetermined voltage set for the variable voltage supply V51 to the horizontal noise line 501.

With this operation, by the instruction for starting the operation via the horizontal shift register control line 74, the horizontal control lines 401, 402, 403, 404, 405, 406, 407, 408, 409, 410, 411, and 412 (the signal control lines 441, 442, and 443 included in the horizontal control lines 401, 402, and 403 in FIG. 5) are selected in order. The pixel signals accumulated in the storage capacitors C441, C442, and C443 corresponding to the selected horizontal control lines are output to the horizontal signal line 502. On the other hand, the horizontal noise line 501 has the predetermined voltage set for the variable voltage supply V51.

As described above, the differential output between the pixel signals for one horizontal line and the predetermined voltage set for the variable voltage supply V51 is output via the output circuit 14. At this time, the predetermined voltage set for the variable voltage supply V51 may use a voltage value acquired by calculating an average value of the noise signal output that is a previously read-out noise.

Next, the still image shooting mode (first mode) for reading out all the pixels corresponding to the operation (4) of the "control of still image shooting" will be described. After exposure, the "normal reading operation" is instructed for the readout operation of the still image. At this time, a pixel portion illustrated in FIG. 3 operates in the order illustrated in FIG. 6.

A driving signal is input via the reset control line 221 to turn on the reset transistor T1 to reset the FD capacitor C1. After the period "Reset" illustrated in FIG. 6 has elapsed, the reset transistor T1 is turned off and the reset of the FD capacitor C1 ends.

Figure 6:
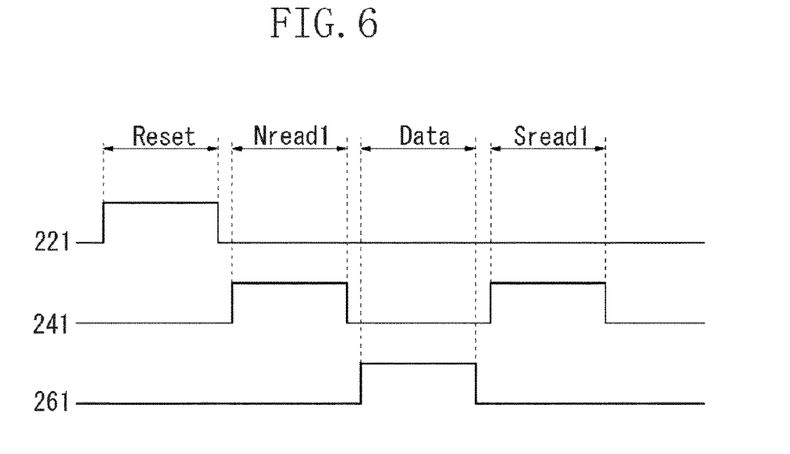
FIG. 6 illustrates an example of an operation at a pixel portion in a "normal reading operation" for shooting a still image according to the first exemplary embodiment of the present invention.

Then, a driving signal is input via the vertical address line 241 to turn on the selection transistor T2 to output the noise signal of the FD capacitor C1 to the vertical signal line 101.

After the period "Nread1" illustrated in FIG. 6 has elapsed, the selection transistor T2 is turned off. Then, a driving signal is input via the transfer control line 261 to turn on the transfer transistor T3 to output the pixel signal of the photoelectric conversion element D1 to the FD capacitor C1.

After the period "Data" illustrated in FIG. 6 has elapsed, the transfer transistor T3 is turned off. Then, a driving signal is input via the vertical address line 241 to turn on the selection transistor T2 to output the pixel signal of the FD capacitor C1 to the vertical signal line 101. After the period "Sread1" in FIG. 6 has elapsed, the selection transistor T2 is turned off.

In the image sensor 2, the "one-line reading operation" is instructed via the vertical shift register control line 34 and the vertical register selection line 35 is selected to select the vertical control lines 201, 202, 203, 204, 205, 206, 207, 208, 209, 210, 211, and 212 for each line in order. With this operation, the pixels for the first line of the image sensor 2 are read out, while, prior to reading the pixel signal, the noises for one horizontal line are read.

In the still image shooting mode, since the addition is not performed, the adding circuit 12 directly transmits the noise signal to the horizontal readout circuit 13. The horizontal readout circuit 13 turns on the transistor T49 via the horizontal readout control line 49, accumulates the noise signals transmitted via the addition output line 301 in the storage capacitor C421, C422, and C423, and then turns off the transistor T49. The operation described above is the noise reading.

Next, the pixel signal reading for the same line is performed. In the still image shooting mode, since the addition is not performed, the adding circuit 12 directly transmits the pixel signal to the horizontal readout circuit 13. The horizontal readout circuit 13 turns on the transistor T50 via the horizontal readout control line 50, accumulates the pixel signal transmitted via the addition output line 301 in the storage capacitor C441, C442, and C443, and then turns off the transistor T50. The operation described above is the pixel signal reading.

By the instruction for starting the operation via the horizontal shift register control line 74, the horizontal control lines 401, 402, 403, 404, 405, 406, 407, 408, 409, 410, 411, and 412 are selected for each column in order. At this time, since the "normal reading operation" is instructed, for example, both of the noise control line 421 and the signal control line 441 included in the horizontal control line 401 become effectively.

Then, the noise signal and the pixel signal are transmitted to the output circuit 14 via the horizontal noise line 501 and the horizontal signal line 502, respectively, and the differential output between the pixel signal and the noise signal is output from the image sensor 2. This operation is repeated for one horizontal line to read out the pixels for the first line. When this operation is performed on all pixels, the still image shooting mode is completed.

The EVF shooting mode (second mode) for displaying on the display unit the shot image corresponding to the operation (2) of the "control of displayed image" will be described. The display unit according to the present exemplary embodiment has a resolution of one third of that of the image sensor 2 in both directions of line and column. An image in which three lines of pixels and three columns thereof are added together in the direction of line and column is displayed.

The "short-time reading operation" is instructed for the operation for EVF reading. At this time, the pixel portion illustrated in FIG. 3 operates in the order illustrated in FIG. 7. Firstly, a driving signal is input via the reset control line 221 to turn off the reset transistor T1 to reset the FD capacitor C1.

Figure 7:
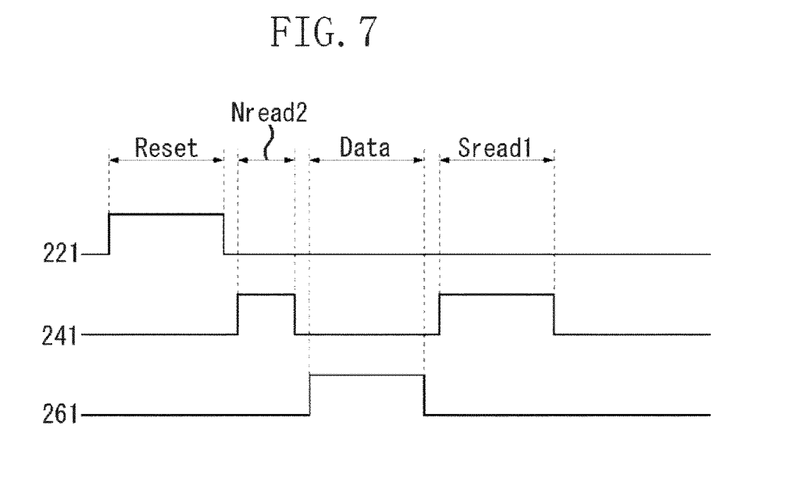
FIG. 7 illustrates an example of an operation at a pixel portion in a "short-time reading operation" for an electronic viewfinder (EVF) according to the first exemplary embodiment of the present invention.

After the period "Reset" illustrated in FIG. 7 has elapsed, the reset transistor T1 is turned off and the reset of the FD capacitor C1 ends.

Then, a driving signal is input via the vertical address line 241 to turn on the selection transistor T2 to output the noise signal of the FD capacitor C1 to the vertical signal line 101. After the period "Nread2" illustrated in FIG. 7 has elapsed, the selection transistor T2 is turned off.

Then, a driving signal is input via the transfer control line 261 to turn on the transfer transistor T3 to output the pixel signal of the photoelectric conversion element D1 to the FD capacitor C1. After the period "Data" illustrated in FIG. 7 has elapsed, the transfer transistor T3 is turned off.

Subsequently, a driving signal is input via the vertical address line 241 to turn on the selection transistor T2 to output the pixel signal of the FD capacitor C1 to the vertical signal line 101. After the period "Sread1" illustrated in FIG. 7 has elapsed, the selection transistor T2 is turned off. The relationship between the period Nread1 and the period Nread2 is defined as Nread1>Nread2. A noise-readout time for a timing for driving the pixel in the "short-time reading operation" illustrated in FIG. 7 is set shorter than that in the "normal reading operation" illustrated in FIG. 6 to increase the frame rate. Further, a variation occurring during readout is decreased by performing addition processing on the surrounding pixels.

A "three-line addition operation" is instructed by the vertical shift register control line 34, and the vertical register selection line 35 is selected so that the vertical control lines 201, 202, 203, 204, 205, 206, 207, 208, 209, 210, 211, and 212 are simultaneously selected for three lines in order. With this operation, the signals for three pixels in the vertical direction are added together and averaged, and output to the vertical signal line.

Of the pixels simultaneously selected for three lines, the pixels (1, 1), (2, 1), (3, 1), (1, 2), (2, 2), (3, 2), (1, 3), (2, 3), and (3, 3) will be described. The pixels following the above-described pixels are added vertically in a similar operation. In this case, prior to reading the pixel signal, the noise is also read.

Hereafter, a signal in which the pixels (1, 1), (2, 1), and (3, 1) are added together and averaged is referred to as a first vertical addition pixel signal, and a signal in which the pixels (1, 2), (2, 2), and (3, 2) are added together and averaged is referred to as a second vertical addition pixel signal. Further, a signal in which the pixels (1, 3), (2, 3), and (3, 3) are added together and averaged is referred to as a third vertical addition pixel signal. The first, second, and third vertical addition pixel signals are output to the vertical signal lines 101, 102, and 103, respectively.

Next, the adding circuit 12 instructs to add the three horizontal pixels together, and the first, second, and third vertical addition pixel signals output to the vertical signal lines 101, 102, and 103 are added together so that nine pixels are added together in all and transmitted to the horizontal readout circuit 13 via the addition output line 301.

The horizontal readout circuit 13 turns on the transistor T49 via the horizontal readout control line 49, accumulates the noise signal transmitted via the addition output line 301 in the storage capacity C421, and then turns off the transistor T49. The above-described operation is the noise reading.

Next, the pixel signals acquired by adding nine pixels together will be read in a similar method as that of the noise reading. The added signals are transmitted to the horizontal readout circuit 13 via the addition output line 301. The horizontal readout circuit 13 turns on the transistor T50 via the horizontal readout control line 50, accumulates the pixel signal transmitted via the addition output line 301 in the storage capacity C441, and then turns off the transistor T50. The above-described operation is the pixel-signal reading.

When the horizontal register selection line 77 is selected, by the instruction for starting the operation via the horizontal shift register control line 74, the horizontal control lines 401, 404, 407, and 410 are selected for each line in order. At this time, since the "short-time reading operation" is instructed, the noise-readout time is controlled to be shorter than that of the signal-readout time. This operation is performed for all pixels, and the EVF readout ends for one frame.

The image data converted at the same resolution as that of the display unit as described above is displayed on the image display unit 7. Further, the image for light metering is generated in a similar conversion method to detect the light metering data, which is then transmitted to the synchronous control unit 10.

As described above, according to the present exemplary embodiment, in the image sensing apparatus capable of changing the time periods for the noise reading and the pixel signal reading of the photoelectric conversion element D1, the noise-readout time is set shorter than that of the signal-readout time, for the EVF readout compared to the still image recording. With this operation, the image-readout time is decreased to increase the frame rate. Further, for the EVF readout, a plurality of pixel signals are added together to decrease variations that may be otherwise caused by the short-time readout.

Figure 8:
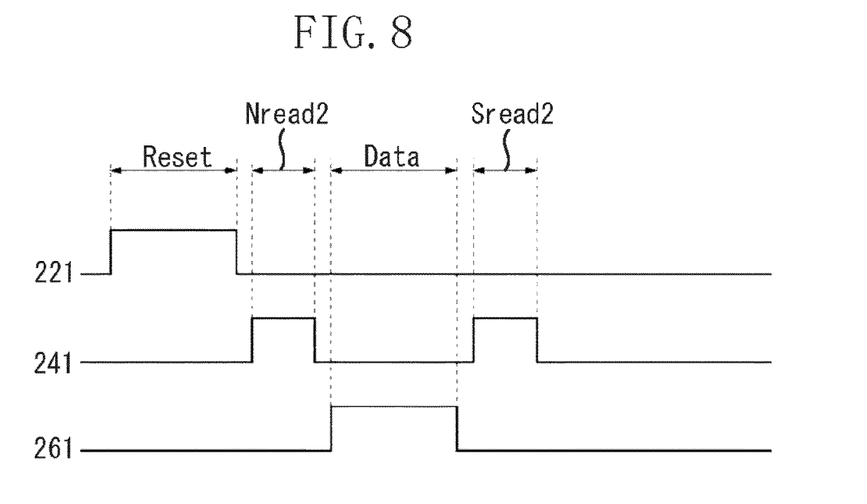
FIG. 8 illustrates an example of an operation at a pixel portion in a "short-time reading operation" for shooting a moving image according to a second exemplary embodiment of the present invention.
Figure 9:
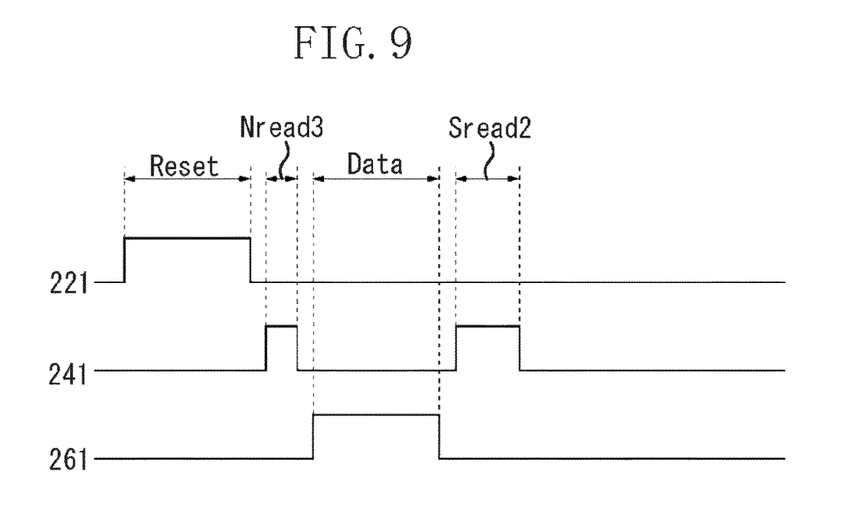
FIG. 9 illustrates another example of an operation at a pixel portion in a "short-time reading operation" for shooting a moving image according to the second exemplary embodiment of the present invention.

With reference to FIGS. 8 and 9, the image sensing apparatus according to a second exemplary embodiment of the present invention will be described. According to the present exemplary embodiment, a basic configuration of the image sensing apparatus and a basic configuration and a basic operation of the image sensor are similar to those of the first exemplary embodiment. Further, since control for shooting a still image is similar to that of the first exemplary embodiment, the description thereof will be omitted.

<Control of Moving Image Shooting>
(1) An instruction by a moving-image shooting switch of the operation unit 9 starts control of moving image shooting.
(2) The signal processing unit 5 detects the light metering data from the image signal transmitted from the image sensor 2 and transmits the light metering data to the synchronous control unit 10.
(3) Based on the light metering data, the synchronous control unit 10 controls the optical system 1 via the driving circuit unit 3.
(4) The image sensor 2 exposes the moving image for recording and outputs the signal.
(5) The signal processing unit 5 converts the image signal from the image sensor 2 into the image data for recording, transmits the image data to the image recording unit 8, records the image data for recording in the detachable memory card, converts the image data for recording into the image data for display, and displays the image data for display on the image display unit 7.
(6) The image sensing apparatus repeats the operations (2) to (5) and waits the instruction from the operation unit 9.

A moving-image shooting mode (third mode) corresponding to the operation (4) <Control of the moving-image shooting> will be described. Firstly, the "short-time reading operation" is instructed for the readout operation of the moving-image shooting. At this time, the pixel portion illustrated in FIG. 3 operates in the order illustrated in FIG. 8. A driving signal is input via the reset control line 221 to turn on the reset transistor T1 to reset the FD capacitor C1. After the period Reset in FIG. 8 has elapsed, the reset transistor T1 is turned off and the reset of the FD capacitor C1 ends.

Next, a driving signal is input via the vertical address line 241 to turn on the selection transistor T2 to output the noise signal of the FD capacitor C1 to the vertical output line 101. After the period Nread2 in FIG. 8 has elapsed, the selection transistor T2 is turned off. Then, a driving signal is input via the transfer control line 261 to turn on the transfer transistor T3 to output the pixel signal of the photoelectric conversion element D1 to the FC capacitor C1. After the period Data in FIG. 8 has elapsed, the transfer transistor T3 is turned off.

Subsequently, a driving signal is input via the vertical address line 241 to turn on the selection transistor T2 to output the pixel signal of the FD capacitor C1 to the vertical output line 101. After the period Sread2 in FIG. 8 has elapsed, the selection transistor T2 is turned off.

Relationships between the periods Nread1 and Nread2 and between the periods Sread1 and Sread2 are defined as Nread1>Nread2 and Sread1>Sread2, respectively. Compared to the timing for driving the pixel in the "normal reading operation" in FIG. 6, the timing for driving the pixel in the "short-time reading operation" in FIG. 8 has the shorter readout period both for the noise signal and the pixel signal. Thus, the frame rate can be increased.

When the relationship Nread2>Nread3 is defined, the noise-reading time may be further decreased as illustrated in FIG. 9. Moreover, the variation during reading out is decreased by performing processing for adding the surrounding pixels on each of the noise-reading data and the pixel-signal reading data.

The moving image is recorded at a resolution of one third of that of the image sensor 2 in the direction of both line and column, and the moving image in which three lines of pixels and three columns thereof are added together in the direction of line and column is recorded. The "three-line addition operation" is instructed by the vertical shift register control line 34. The vertical register selection line 35 is selected so that the three lines among the vertical control lines 201, 202, 203, 204, 205, 206, 207, 208, 209, 210, 211, and 212 are simultaneously selected in order.

With this operation, the signals for three pixels in the vertical direction are added together and averaged, and then output. Of the pixels simultaneously selected for three lines, the pixels (1, 1), (2, 1), (3, 1), (1, 2), (2, 2), (3, 2), (1, 3), (2, 3), and (3, 3) will be described. The subsequent pixels are vertically added together in a similar operation. In this case, prior to reading the pixel signal, the noise is also read.

Hereafter, the signal in which the pixels (1, 1), (2, 1) and (3, 1) are added together and averaged is referred to as a first vertical addition pixel signal, and a signal in which the pixels (1, 2), (2, 2), and (3, 2) are added together and averaged is referred to as a second vertical addition pixel signal. Further, a signal which the pixels (1, 3), (2, 3), and (3, 3) are added together and averaged is referred to as a third vertical addition pixel signal. The first, second, and third vertical addition pixel signals are output to the vertical signal lines 101, 102, and 103, respectively.

Next, the adding circuit 12 instructs to add the three horizontal pixels together, and the vertical addition pixel signals 11, 12, 13 output to the vertical signal lines 101, 102, and 103 are added together so that nine pixels are added together in all and transmitted to the horizontal readout circuit 13 via the addition output line 301.

The horizontal readout circuit 13 turns on the transistor T49 via the horizontal readout control line 49, accumulates the noise signal transmitted via the addition output line 301 in the storage capacity C421, and then turns off the transistor T49. The above-described operation is the noise reading.

Next, the pixel signals acquired by adding nine pixels together are read in a similar method as that of the noise reading. The added signals are transmitted to the horizontal readout circuit 13 via the addition output line 301. The horizontal readout circuit 13 turns on the transistor T50 via the horizontal readout control line 50, accumulates the pixel signal transmitted via the addition output line 301 in the storage capacity C441, and then turns off the transistor T50. The above-described operation is the pixel-signal reading.

When the horizontal register selection line 77 is selected, by the instruction for starting the operation via the horizontal shift register control line 74, the horizontal control lines 401, 404, 407, and 410 are selected for each line in order. At this time, since the "short-time reading operation" is instructed, the noise-readout time is controlled to be shorter than that of the signal-readout time. This operation is performed for all pixels, and the moving-image readout ends for one frame.

The image data converted at the same resolution as that of the display unit as described above is displayed on the image display unit 7. Further, the image for light metering is generated in a similar conversion method to detect the light metering data, which is then transmitted to the synchronous control unit 10.

As described above, according to the present exemplary embodiment, in the image sensing apparatus capable of changing the time periods for the noise reading and the pixel signal reading of the photoelectric conversion element D1, the noise-readout time is set shorter than that of the signal-readout time, for the moving-image readout compared to the still image recording. With this operation, the image-readout time is decreased to increase the frame rate. Further, for the moving-image readout, a plurality of pixel signals are added together to decrease variations that may be otherwise caused by the short-time readout.

While the present invention has been described with reference to exemplary embodiments, it is to be understood that the invention is not limited to the disclosed exemplary embodiments. The present invention may be applicable to, for example, a digital still camera, a digital compact camera, a video camera, a web camera, and a built-in camera function of a cellular phone. The scope of the following claims is to be accorded the broadest interpretation so as to encompass all modifications, equivalent structures, and functions.

This application claims priority from Japanese Patent Application No. 2008-223573 filed Sep. 1, 2008, which is hereby incorporated by reference herein in its entirety.

What is claimed is:

1. An apparatus comprising a sensor having a plurality of pixels and a control unit configured to control the sensor,
    each of the plurality of pixels comprising:
        a photoelectric conversion element configured to convert light into an electric charge;
        an amplifier configured to input a signal of the photoelectric conversion element to the amplifier when being turned on;
        a transfer switch configured to input a signal of the photoelectric conversion element to the amplifier when being turned on; and
        a reset switch configured to reset the input to the amplifier when being turned on,
    the control unit for executing a first readout operation in which, sequentially with the transfer switch turned off and with the reset switch turned on, a first signal is output from the amplifier to an output line and a second readout operation in which, sequentially with the reset switch turned off and with the transfer switch turned on, a second signal is output from the amplifier to the output line, and
    the control unit for further selecting and executing a first mode in which the first readout operation and the second readout operation are executed for respective predetermined time periods to acquire an image and a second mode in which the first readout operation is executed for a time period shorter than the predetermined time period for the first mode by a short-time reading operation and the second readout operation is executed to acquire an image for light metering.

2. The apparatus according to claim 1, wherein the first signal is a noise signal and the second signal is a pixel signal.

3. The apparatus according to claim 1, wherein the first mode is a still image shooting mode and the second mode is moving-image shooting mode.

4. The apparatus according to claim 3, wherein the moving image shooting mode adds and averages a plurality of pixel signals.

5. An apparatus comprising a sensor having a plurality of pixels and a control unit configured to control the sensor,
    each of the plurality of pixels comprising:
        a photoelectric conversion element configured to convert light into electric charge;
        an amplifier configured to input a signal of the photoelectric conversion element to the amplifier when being turned on;
        a transfer switch configured to input a signal of the photoelectric conversion element to the amplifier when being turned on; and
        a reset switch configured to reset the input to the amplifier when being turned on,
    the control unit for executing a first readout operation in which, sequentially with the transfer switch turned off and with the reset switch turned on, a first signal is output from the amplifier to a signal output line and a second readout operation in which, sequentially with the reset switch turned off and with the transfer switch turned on, a second signal is output from the amplifier to the output line, and
    the control unit for further selecting and executing a first mode in which the first readout operation and the second readout operation are executed for respective predetermined time periods to acquire an image and a second mode in which the first readout operation and the second readout operation are executed for respective time periods shorter than the predetermined time periods for the first mode by a short-time reading operation to acquire an image for light metering.

6. The apparatus according to claim 5, wherein the first signal is a noise signal and the second signal is a pixel signal.

7. The apparatus according to claim 5, wherein the first mode is a still image shooting mode and the second mode is a moving image shooting mode.

8. The apparatus according to claim 7, wherein the moving image shooting mode adds and averages a plurality of pixel signals.

* * * * *